Jan. 9, 1962 P. J. O'NEILL 3,016,072
METHOD AND APPARATUS FOR DISPENSING PREDETERMINED
QUANTITIES OF LIQUID
Filed May 26, 1958 3 Sheets-Sheet 2
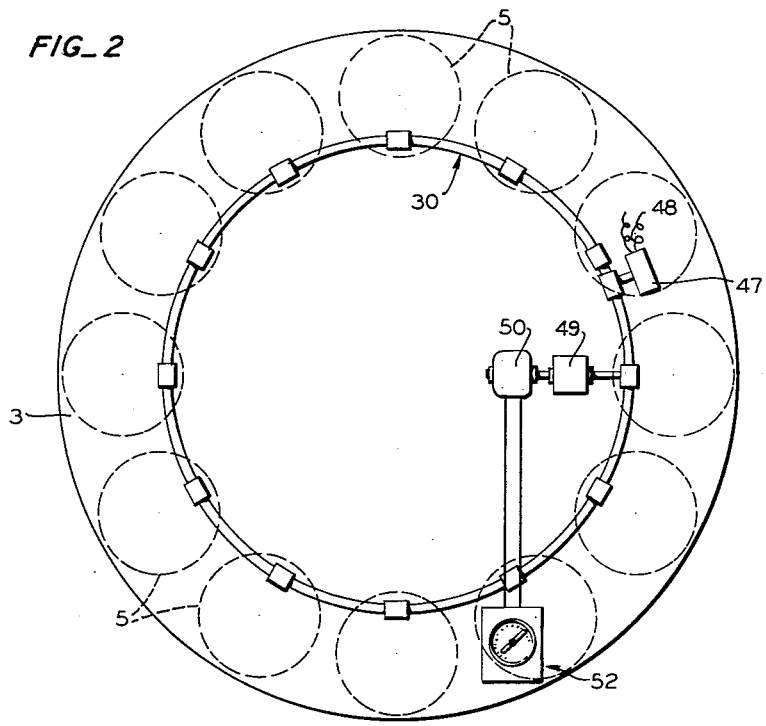
FIG_2
INVENTOR.
PAUL J. O'NEILL
BY
Bayken, Hohler & Wood.
ATTORNEYS

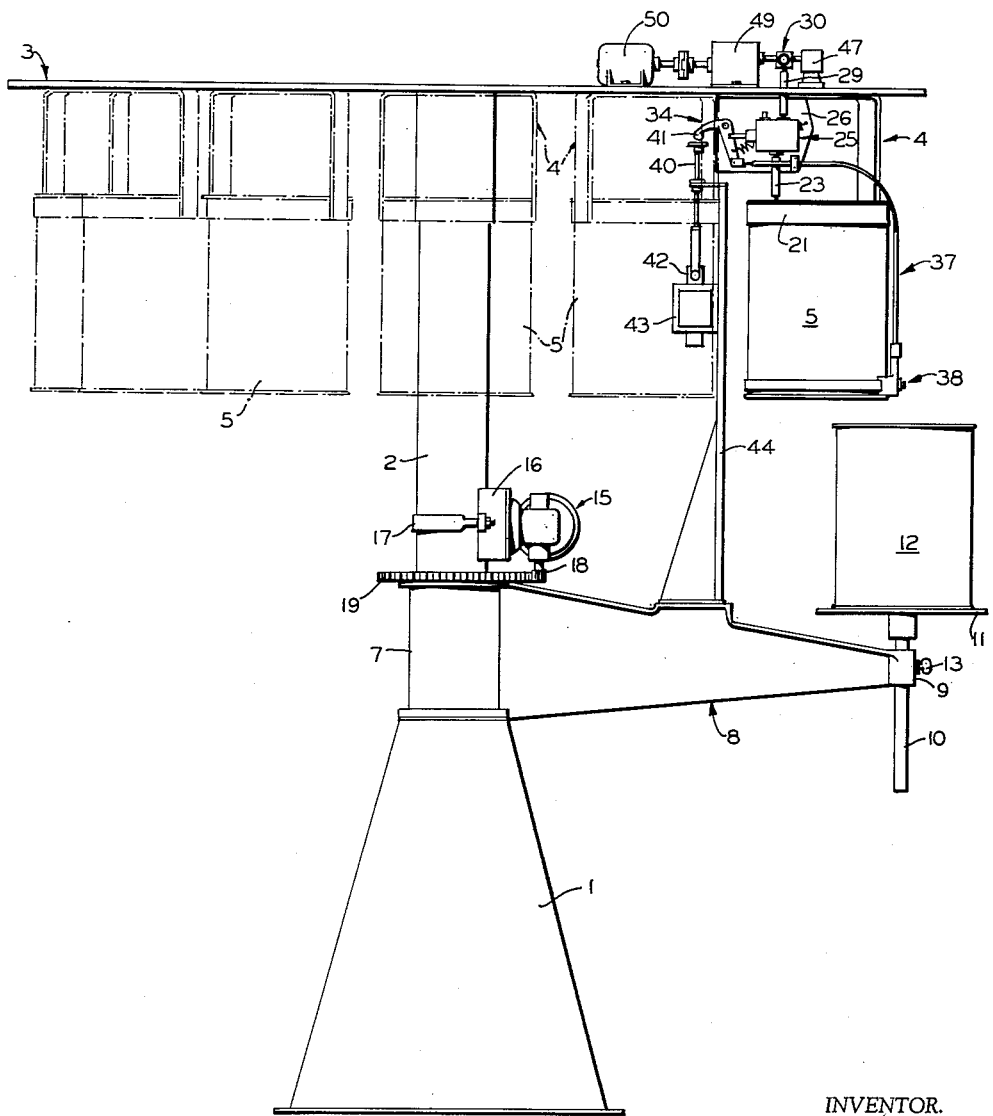

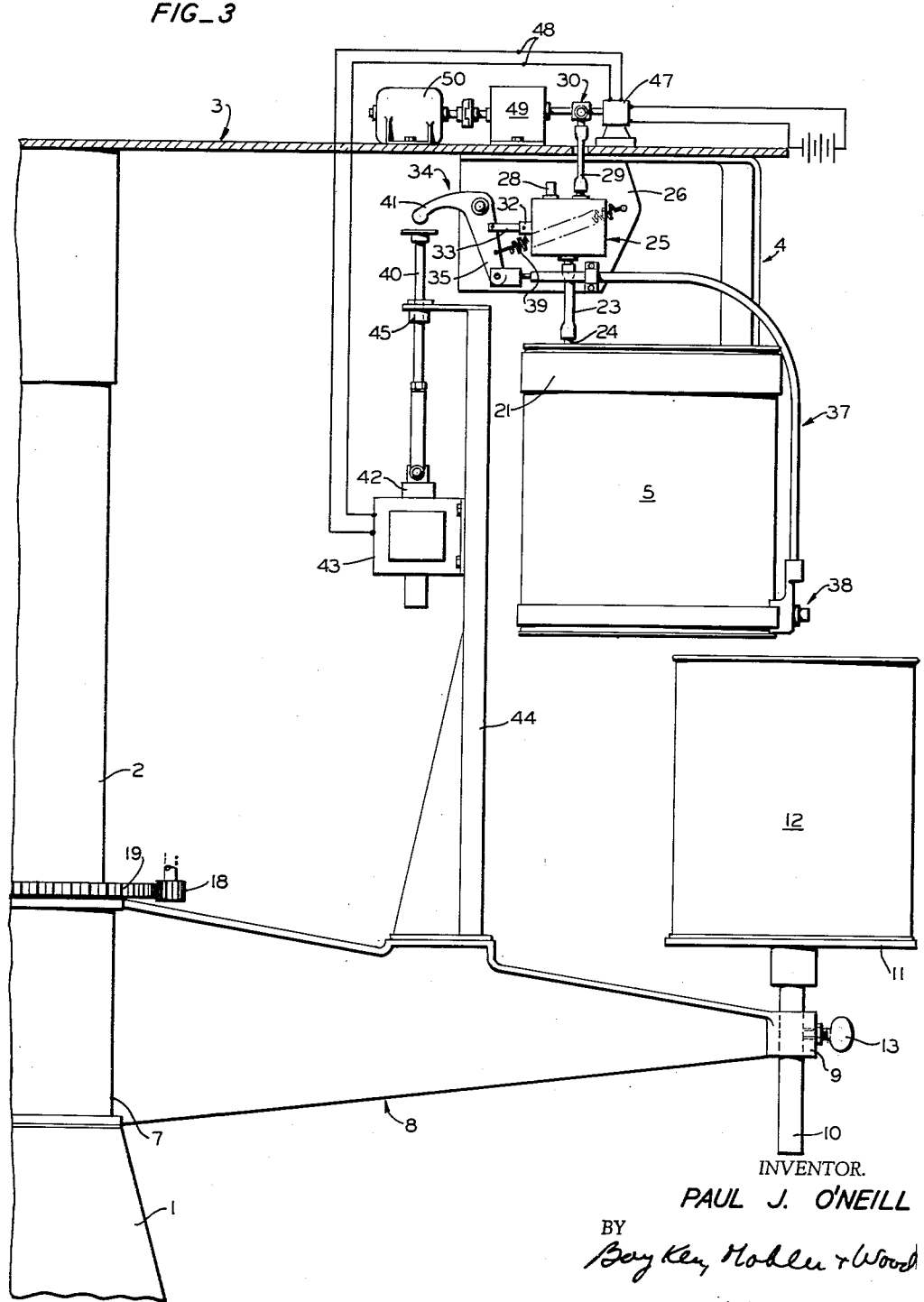

United States Patent Office 3,016,072
Patented Jan. 9, 1962

3,016,072
METHOD AND APPARATUS FOR DISPENSING PREDETERMINED QUANTITIES OF LIQUID
Paul J. O'Neill, 166 Woodward St., Sausalito, Calif.
Filed May 26, 1958, Ser. No. 737,569
8 Claims. (Cl. 141—103)

This invention relates to a method and apparatus for accurately dispensing predetermined quantities of liquid from a reservoir or container.

Heretofore, various accurate devices have been available for dispensing predetermined amounts of liquid when such amounts are uniform. Bottle fillers, for example, have been designed that are extremely accurate in performance but such fillers rely on a positive displacement principle in which the measuring means is, necessarily, in contact with the liquid to be dispensed. Furthermore, such devices find their most efficient use when the quantity of liquid to be dispensed at each step is the same.

The main object of the present invention is the provision of an accurate method and apparatus for dispensing predetermined quantities of liquid when the amount to be dispensed may vary.

Another object of the invention is the provision of a method and apparatus for dispensing predetermined quantities of liquid when it is undesirable that the measuring means comes in contact with the liquid to be dispensed.

The present invention lends itself particularly to dispensing liquid paint pigment. In such a case the amount of pigment of one color required to be dispensed into the paint pot depends upon the intensity of such pigment required to effect the desired final color or shade and may not be the same for any two combinations of pigment to be employed.

Furthermore, paint pigment does not lend itself to measuring by a piston displacement means as used in bottle fillers because the operating parts tend to stick due to the nature of the material. Furthermore, any particular paint pigment may be used only intermittently and nonuse of the operating parts over a period of time also tends to cause them to stick.

The present invention will therefore be described in connection with dispensing paint pigment for illustrative purposes, but it will be understood that it lends itself to use with other liquids because of the inherent advantages noted above.

Other objects and advantages will be apparent from the folowing specification and from the claims:

FIG. 1 is a side elevation of a paint pot filling device incorporating the apparatus of the invention.

FIG. 2 is a top plan view of the apparatus of FIG. 1, and

FIG. 3 is a greatly enlarged, semi-schematic elevation of a fragmentary portion of the dispensing mechanism.

In detail, the invention is shown in the drawings as used with a paint mixing assembly which may include a base 1 for a stationary post 2 which supports at its upper end a platform 3. Depending from said platform 3 are a plurality of supports 4 for supporting any desired number of pigment reservoirs or containers 5, twelve being shown on the drawings (FIG. 2). It will be understood that the pigment dispensing apparatus is the same for each container and only one will subsequently be described in detail (FIG. 3).

Rotatably supported on post 2 by sleeve 7 is the inner end of a radially extending arm generally designated 8 that is formed at its outer end with a vertically extending bushing 9 for receiving therein a vertical shaft 10 supporting at its upper end a horizontal support plate 11 adapted to receive a paint pot 12 thereon. A thumbscrew 13 is provided on arm 8 to secure the support plate 11 in any desired vertically adjusted position.

As best seen in FIG. 1 arm 8 is rotated by means of a gearmotor 15 having a base 16 secured through strap 17 to post 2. The output shaft of gearmotor 15 is provided with a pinion 18 meshing with a gear 19 carried by sleeve 7 of arm 8. By this apparatus it is possible to swing arm 8 to any one of twelve positions for dispensing pigment into paint pot 12.

As stated above, supports 4 support pigment containers 5. This can be accomplished by providing straps 21 on the lower ends of support 4 which may be tightened around the upper ends of the containers 5 by any suitable means (not shown) to facilitate replacement of the containers 5 when empty.

Containers 5 are hermetically sealed except for two openings to be described. Connected to the top of each container 5 is a conduit 23 which may be flexible to permit replacement of the containers (FIG. 3). Each conduit 23 is connected at its lower end to a short vent pipe 24 sealed as by soldering to the container top and at its upper end to a three-way valve generally designated 25 which may be supported on a bracket 26 depending from the lower side of platform 3.

Three-way valve 25 is provided with a vent 28 to atmosphere and with a supply conduit 29 that extends through a suitable opening in platform 3 and is connected at its other end to a manifold 30 (FIG. 2) that is in turn connected to all of the corresponding supply conduits 29 of the remaining eleven valves 25.

The spool of valve 25 is provided with an actuating rod 32 that is connected by link 33 to one arm 35 of a bell crank 34 swingably supported on bracket 26.

At this point it may be noted that the valve 25 is designed so that container 5 is vented to atmosphere through conduit 23, valve 25 and vent 28 when the bellcrank 34 is in the inoperative position shown in FIG. 3. When the valve spool is moved to the left (FIG. 3) by swinging bellcrank 34 in a clockwise direction the container 5 is connected through valve 25 with the supply line 29 and manifold 30 and is of course simultaneously disconnected from the atmospheric vent 28.

Bell crank arm 35 is also connected at its outer end to one end of a flexible cable assembly generally designated 37 which is connected at its opposite end to a discharge valve 38 connected to container 5 at its lower end and on its radially outwardly directed side. It will therefore be apparent that swinging bellcrank 34 in a clockwise direction not only disconnects container 5 from the atmosphere and connects it with manifold 30 but also opens the discharge valve 38 through the action of flexible cable 37.

To simplify the disclosure the agitator employed to mix the pigment in container 5 is not described herein, nor is the power means for driving such agitator. However, it will be understood that such an agitator may be employed to prevent the pigment from settling.

The bell crank 34 is actuated by a vertically disposed push rod 40 which, upon upward movement thereof, engages the outer end of the arm 41 of bell crank 34 to swing it clockwise. The bell crank is returned to the position shown by extension spring 39.

Rod 40 is connected at its lower end to the plunger 42 of a solenoid 43 which in turn is secured to a vertically extending bracket 44 carried by arm 8. A bearing 45 may also be provided on bracket 44 through which rod 40 reciprocates.

It will be apparent that the arm 8 may be rotated to a position at which the container 5 containing the desired pigment to be mixed is directly over the paint pot to be filled. It will be noted when the bell crank is in normal position that there is a slight clearance between the top of push rod 40 and the end of arm 41 of bell crank 34 (FIG. 3) so that said push rod may move to a position under the bell crank arm without interference.

Referring now to FIGS. 2 and 3 the manifold 30 is connected to a sensitive pressure switch 47 which is set to close whenever the pressure in manifold 30 exceeds atmospheric. Said switch 47 is connected by leads 48 to solenoid 43 so that the latter is energized whenever the pressure in manifold 30 exceeds atmospheric. Air, or any other desired gas, is supplied under pressure to manifold 30 by means of air pump 49 driven by motor 50. The number of rotations of motor 50 determines the number of units of volume pumped and this permits the use of a counter generally designated 52 connected with motor 50. Counter 52 is graduated in units of volume and is provided with a settable dial permitting the operator to set the counter at the amount of pigment to be dispensed from any particular reservoir or can.

In this connection the invention has been adapted for use with a punch card system by which a punch card bearing the necessary information as to station and volume is applied to a bank of circuits. In this manner automatic electrical means are provided for indexing the arm 8 and for controlling the amount of pigment dispensed at any particular station so that all of the necessary pigments in their predetermined quantities are supplied automatically without manual intervention. However, for purposes of the present application such automatic means are omitted and the instant disclosure is directed only to the method and means for dispensing the liquid.

In operation, the arm 8 is rotated so that the paint pot 12 carried thereby is disposed beneath the reservoir 5 from which pigment is to be dispensed. A volume of air equal to the volume of the liquid to be dispensed is then supplied to manifold 30 which is normally sealed against escape of air therefrom. The increase in pressure resulting from the additional air supplied to manifold 30 causes sensitive pressure switch 47 to close the circuit of solenoid 43 which in turn acts through push rod 40 to swing bell crank 34 in a clockwise direction. Three-way valve 25 is thus actuated to seal reservoir 5 from the atmosphere and simultaneously connect it with manifold 30. At the same time discharge valve 38 at the bottom reservoir 5 is opened to permit the liquid pigment to be discharged into paint pot 12.

It will be understood that the elevated air pressure in reservoir 5 accelerates the discharge of pigment and such discharge continues until pressure switch 47 registers atmospheric. This will occur after the desired volume of air has been supplied to manifold 30 and the corresponding volume of pigment has been discharged through valve 38. In other words, since the air pressure above the pigment in reservoir 5 was previously at atmospheric pressure and the discharge valve 38 is closed whenever such pressure is restored to atmospheric, it will be apparent that the amount of pigment discharged is exactly equal to the amount of air supplied to manifold 30, which amount, in turn, is supplied to reservoir 5. Of course, the tolerance involved is dependent upon the sensitiveness of the pressure switch 47 which of course must have a high degree of accuracy.

The above described method and apparatus permit extremely accurate measurement of the discharged liquid without the use of moving parts which may be fouled by the liquid to be discharged.

It will be apparent that the method disclosed may be carried out by other apparatus than that shown and it will also be understood that the required apparatus is not necessarily restricted to the exact embodiment shown but may take other forms which will occur to those skilled in the art without departing from the invention defined by the following claims.

I claim:

1. The method of dispensing a predetermined quantity of liquid from a container comprising the steps of: hermetically sealing the container with said liquid therein at atmospheric pressure, introducing a quantity of gas into said container of a volume at atmospheric pressure equal to the volume of the predetermined quantity of liquid to be dispensed, and permitting said liquid only to escape from said container until the pressure in said container is restored to atmospheric.

2. The method of dispensing a predetermined quantity of liquid from a container comprising the steps of: hermetically sealing said container with said liquid therein at atmospheric pressure, introducing a quantity of gas into said container of a volume of atmospheric pressure equal to the volume of the predetermined quantity of liquid to be dispensed, and simultaneously opening said container and permitting said liquid only to escape from said container until the pressure in said container is restored to atmospheric.

3. The method of dispensing a predetermined quantity of liquid from a container comprising the steps of: hermetically sealing said container with said liquid therein at atmospheric pressure, introducing a quantity of gas into said container of a volume at atmospheric pressure equal to the volume of the predetermined quantity of liquid to be dispensed, and simultaneously opening said container and permitting said liquid only to escape from said container until the pressure in said container is restored to atmospheric, and thereafter closing said container to the outflow of liquid therefrom when the pressure therein reaches atmospheric.

4. Apparatus for dispensing a predetermined quantity of liquid from a container containing such liquid comprising: means for hermetically sealing said container at atmospheric pressure, means for introducing into said container at a point above the fluid level a quantity of gas of a volume equal to the volume of the predetermined quantity of liquid to be dispensed, means for opening said container at a point adjacent the bottom thereof to the outflow of liquid therefrom when said gas is introduced and means for closing said container to such outflow when the pressure therein is restored to atmospheric.

5. Apparatus for dispensing a predetermined quantity of liquid from a container containing such liquid comprising: a source of gas under pressure, first valve means for alternatively connecting said container with the atmosphere and with said source, means for limiting the volume of gas introduced into said container to a predetermined quantity, second valve means for opening and closing said container to the outflow of liquid therefrom, means for actuating said first valve means for simultaneously connecting said container with said source and for opening said second valve means, and means for actuating said first valve means for simultaneously connecting said container with the atmosphere and for closing said second valve means when the pressure in said container is restored to atmospheric.

6. Apparatus for dispensing predetermined quantities of a plurality of liquids into a receptacle comprising: a plurality of containers respectively containing said plurality of liquids, means supporting said receptacle for successive movement to positions below certain of said containers for receiving liquid therefrom by gravity, means for successively introducing a predetermined quantity of air into said certain containers at a point above the fluid level, means for successively opening said certain containers for outflow of liquid therefrom into said receptacle, and means for closing said last mentioned means when the liquid discharged from a container equals such quantity of air by volume at atmospheric pressure.

7. Apparatus for dispensing predetermined quantities of a plurality of liquids into a receptacle comprising: a plurality of containers respectively containing said plurality of liquids, means supporting said receptacle for successive movement to positions below certain of said containers for receiving liquid therefrom by gravity, a manifold connected with all of said containers, air moving means connected with said manifold for introducing into the latter a predetermined volume of air, first valve means for connecting each of said containers with said manifold and second valve means for opening each of said containers for the outflow of liquid therefrom into said receptacle, and pressure registering means connected with said manifold for closing said second valve means when the volume of liquid dispensed from a container is equal to said predetermined volume of air at atmospheric pressure.

8. The method of dispensing a predetermined quantity of liquid from a container partially filled with said liquid comprising the steps of: hermetically sealing the container with said liquid therein at atmospheric pressure, introducing a quantity of gas into said container of a volume at atmospheric pressure equal to the volume of the predetermined quantity of liquid to be dispensed, opening said container at a point below the level of said liquid and permitting said liquid only to escape from said container until the pressure in said container is restored to atmospheric.

References Cited in the file of this patent

UNITED STATES PATENTS

| | | |
|---|---|---|
| 2,402,329 | Holm | June 18, 1946 |
| 2,671,590 | McBean et al. | Mar. 9, 1954 |
| 2,723,790 | Spiess | Nov. 15, 1955 |
| 2,802,490 | Ward | Aug. 13, 1957 |

FOREIGN PATENTS

| | | |
|---|---|---|
| 767,280 | Great Britain | June 30, 1957 |